(12) United States Patent
Bidou et al.

(10) Patent No.: US 7,463,952 B2
(45) Date of Patent: Dec. 9, 2008

(54) METHOD AND DEVICE FOR PROCESSING MEASUREMENT SIGNALS FROM A MOVEMENT SENSOR ON BOARD A MOTOR VEHICLE

(75) Inventors: Patrick Bidou, Plaisance du Touch (FR); Georges Fonzes, Juan-les-Pins (FR)

(73) Assignee: Continental Automotive France, Toulouse (FR)

( * ) Notice: Subject to any disclaimer, the term of this patent is extended or adjusted under 35 U.S.C. 154(b) by 476 days.

(21) Appl. No.: 11/247,184

(22) Filed: Oct. 12, 2005

(65) Prior Publication Data

US 2006/0080006 A1 Apr. 13, 2006

(30) Foreign Application Priority Data

Oct. 13, 2004 (FR) .................................. 04 10764

(51) Int. Cl.
 *G01C 21/26* (2006.01)
(52) U.S. Cl. ............................................ 701/1; 73/146
(58) Field of Classification Search ..................... 701/1, 701/34, 207, 29, 70, 74, 76, 79; 123/479, 123/370, 406.36, 406.46; 73/118.1, 146, 73/118.01
See application file for complete search history.

(56) References Cited

U.S. PATENT DOCUMENTS

| | | | |
|---|---|---|---|
| 4,233,599 A * | 11/1980 | Brearley | 340/679 |
| 4,564,916 A * | 1/1986 | Hori et al. | 701/34 |
| 4,638,289 A | 1/1987 | Zittnik | |
| 4,759,212 A | 7/1988 | Sawada et al. | |
| 6,279,375 B1 | 8/2001 | Draxelmayr | |
| 2004/0117082 A1* | 6/2004 | Bidou et al. | 701/33 |

FOREIGN PATENT DOCUMENTS

| DE | 197 07 263 A1 | 8/1998 |
|---|---|---|
| DE | 101 46 031 | 4/2003 |

* cited by examiner

*Primary Examiner*—Dalena Tran
(74) *Attorney, Agent, or Firm*—Young & Thompson

(57) ABSTRACT

The invention relates to a method of processing measurement signals from a movement senor on board a motor vehicle, according to which, initially, and in a preliminary phase, a reference value AcOff, called offset value, is stored, representative of the value of the signal output by the movement sensor, with the vehicle stopped, a so-called noise value Bb representative of the white noise of said sensor, and an acceleration value Sa determining a running threshold of the motor vehicle. Then, according to this method, and throughout the life of the vehicle, sequences of n successive measurements are taken of the value Ac(t) of the signal output by the movement sensor, and, for each of these sequences, the stored offset value AcOff is subtracted from each of the n measured value and each of the duly calculated values is compared with the stored running threshold, and information representative of a stopped state of the vehicle is transmitted if, and only if, the n calculated values are all less than the stored running threshold and roughly equal to each other with a tolerance margin corresponding to the stored noise value.

18 Claims, 2 Drawing Sheets

Figure 3:
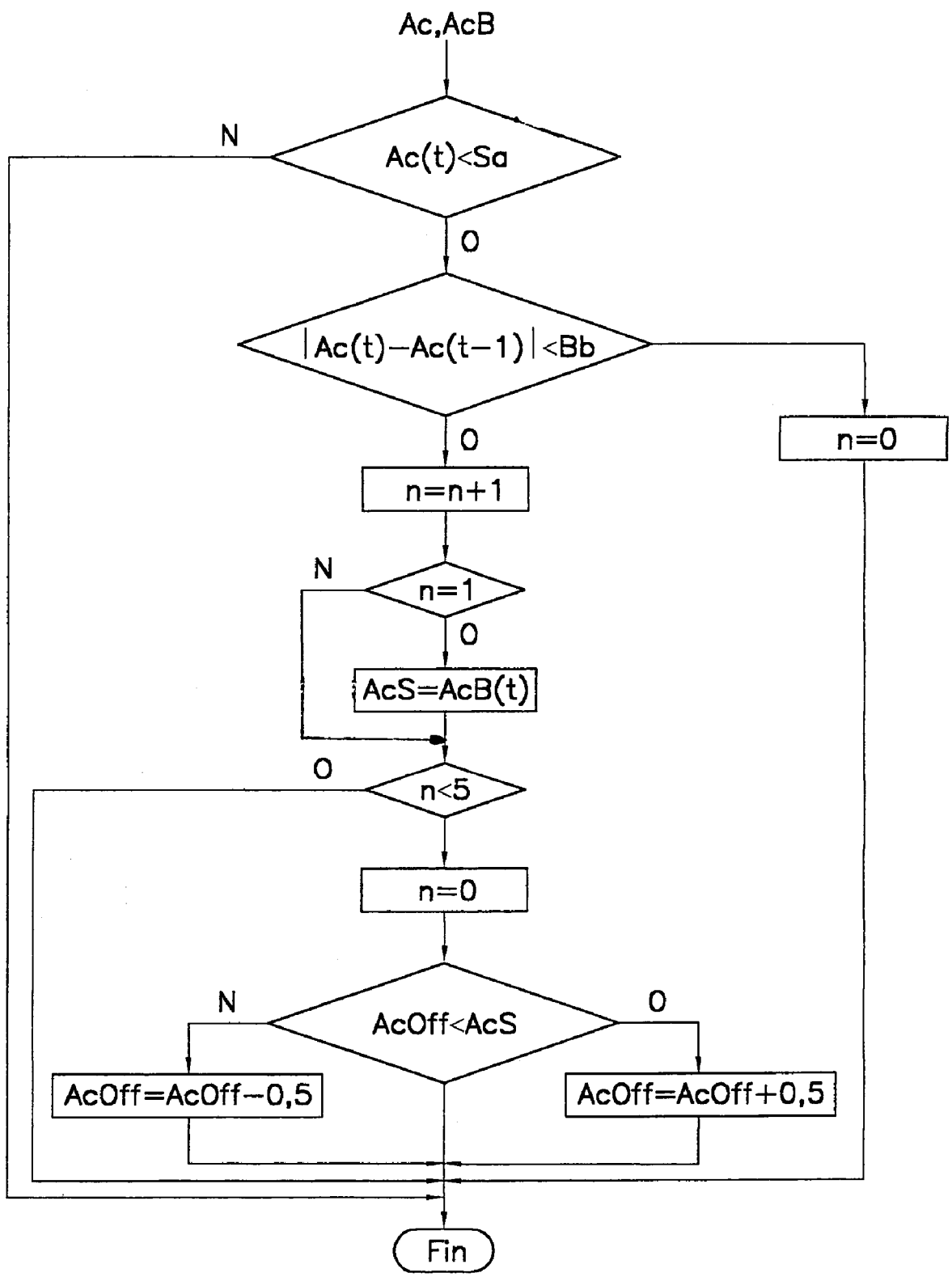

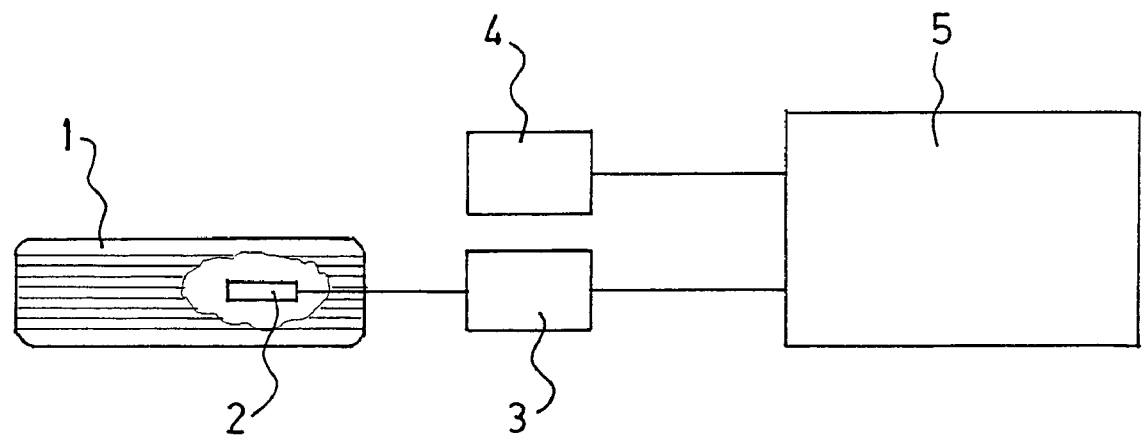
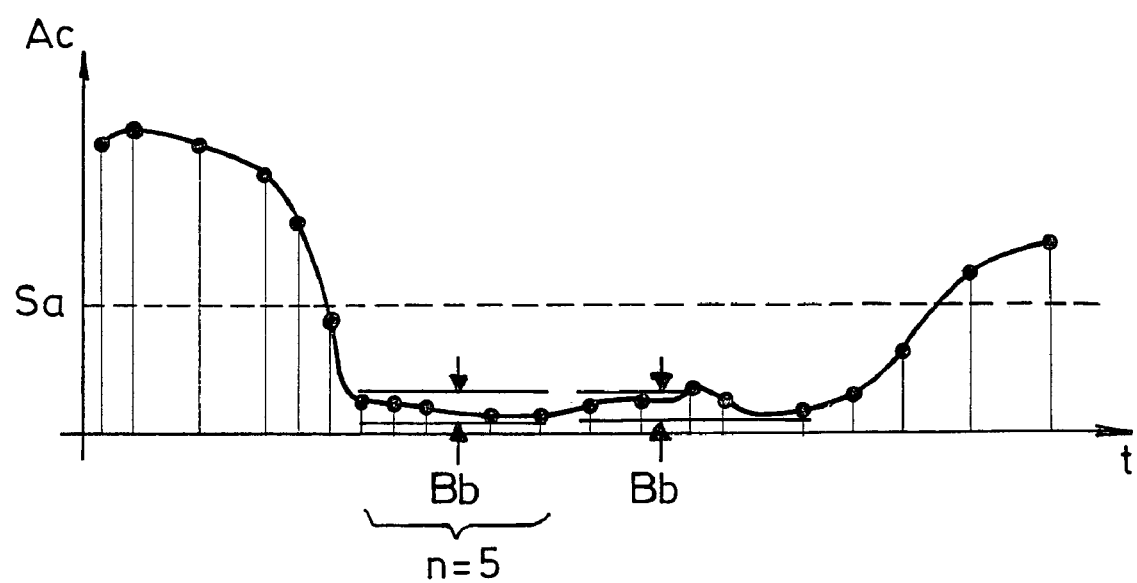

METHOD AND DEVICE FOR PROCESSING MEASUREMENT SIGNALS FROM A MOVEMENT SENSOR ON BOARD A MOTOR VEHICLE

The invention relates to a method and a device for processing measurement signals from a movement sensor on board a motor vehicle.

Increasingly, motor vehicles have parameter monitoring and/or measurement systems including sensors mounted on said vehicle.

An example of such systems are monitoring systems including sensors mounted on each wheel of the vehicle, dedicated to measuring parameters, such as the pressure and/or temperature of the tires fitted on these wheels, and intended to inform the driver of any abnormal variation in the measured parameter.

These monitoring systems conventionally include:
  mounted on each wheel of the vehicle, a module incorporating a measurement sensor, a microprocessor and a radio frequency transmitter,
  and, mounted on the vehicle, a central processing unit receiving the signals sent by the transmitters, provided with a computer incorporating a radio frequency receiver connected to an antenna.

Increasingly, these monitoring systems usually include a movement sensor designed to be on board with the measurement sensor, and intended to provide information representative of the state of movement of the vehicle (stopped or running).

Such information can be used to introduce two modes of operation of the monitoring systems, differentiated by the frequency of transmission of the signals from the measurement sensors to the central processing unit, and programmed so that this transmission frequency is reduced in the operating mode corresponding to the stopped state of the vehicle.

This management of the transmission frequency of the signals from the measurement sensors leads, in practice, when the vehicle is stopped, to a reduction, on the one hand, of the consumption of the batteries powering the onboard microprocessors, and on the other hand, of the "pollution" of the environment surrounding the vehicle, and, consequently, in particular, of the risks of spurious interference between neighboring vehicles.

The movement sensors conventionally used for the above-mentioned purposes consist of accelerometers made up of deformable beam-type strain gages, which are distinguished in particular, negatively, by the fact that they start off with a significant "offset", which leads to a very approximate determination of the "boundary" value between the stopped and running states, and means that a high running threshold must be chosen, of approximately 40 km/h.

The present invention seeks to overcome this drawback and has a first object of providing a method of processing measurement signals from a movement sensor of the accelerometer type currently used, enabling in particular a more accurate determination and significantly lowering the running threshold forming the "boundary" between the stopped and running states of a vehicle.

Another object of the invention is to enable any drifts resulting from the aging of said sensor and temperature variations to be corrected throughout the life of the movement sensor.

To this end, the invention is directed firstly at a method of processing measurement signals from a movement sensor on board a motor vehicle, according to which:
  in a preliminary phase:
    the value of the signal output by the movement sensor is measured, with the vehicle stopped, and said measured value is stored as a reference value, called an offset value,
    an acceleration value determining a running threshold of the motor vehicle is fixed and stored,
    a so-called noise value is stored, characteristic of the operation of the movement sensor, and representative of the white noise of the latter,
  then, throughout the life of the vehicle, sequences of n successive measurements of the value of the signal output by the movement sensor are carried out, and for each of these sequences, the stored offset value is subtracted from each of the n measured values and each of the duly calculated values is compared with the stored running threshold, and information representative of a stopped state of the vehicle is transmitted if, and only if, the n calculated values are all less than the stored running threshold and roughly equal to each other with a tolerance margin corresponding to the stored noise value.

The method according to the invention therefore consists in performing sequences of several (n) successive measurements, and in considering that the vehicle is stopped only if these n measurements are stable and less than the running threshold. In other words, the method according to the invention is based on a principle which states that it is physically unrealistic for a vehicle to be able to move, during a time lapse equivalent to a sequence of measurements, with a very slow movement speed (below the vehicle running threshold), and stable movement speed (small deviation between the measured values, less than the noise value).

In practice, this principle is confirmed and the method according to the invention makes it possible to fix a running threshold of approximately 10 to 15 km/h, in particular as a function of the white noise of the sensor.

According to an advantageous embodiment, following each sequence of n measurements giving rise to vehicle stopped information, the n measured values of said sequence of n measurements are substituted for the stored offset value.

This embodiment causes the stored offset value to change and thus to continually correct any drifts resulting from the aging of the sensor and temperature variations.

Furthermore, according to another advantageous embodiment of the invention, and following each sequence of n measurements giving rise to vehicle stopped information, a so-called sequence value is determined, representative of the n measured values of said sequence of measurements, this sequence value is compared with the stored offset value, and the following is fixed as the new offset value that is stored:
  the stored offset value added to a predetermined correction coefficient if the sequence value is greater than the stored offset value,
  and the stored offset value subtracted from a predetermined correction coefficient if the sequence value is less than the stored offset value.

According to this principle, the new offset value stored following a sequence of n measurements giving rise to vehicle stopped information is differentiated simply from the old stored value by the value of a predetermined coefficient, such that any risks of unjustified drifts in the stored value, which can, for example, result from defects in the storage means, are ruled out.

On the basis of this advantageous embodiment, in addition and according to the method of the invention, on the one hand the value of the correction coefficient is fixed at 0.5, and on the other hand, the first measured value of the corresponding sequence of n measurements is fixed as the value of a sequence.

Moreover, advantageously according to the invention, each sequence of measurements consists in measuring successively, with an interval roughly between 10 seconds and 60 seconds, n values of the signal output by the movement sensor.

Furthermore, each sequence of measurements advantageously consists in performing n=5 successive measurements of the value of the signal output by the movement sensor.

The invention is extended to a device for processing measurement signals from a movement sensor on board a motor vehicle, comprising, in combination:

means of measuring the values of the signals output by the movement sensor, means of storing a reference value, called an offset value, representative of the value of the signal output by the movement sensor, with the vehicle stopped, a so-called noise value, characteristic of the operation of the movement sensor, and representative of the white noise of the latter, and an acceleration value determining a running threshold of the motor vehicle, and a computation unit connected to the measurement means and to the storage means, and programmed, throughout the life of the vehicle, to command sequences of n successive measurements of the value of the signal output by the movement sensor, and, for each of these sequences, to subtract the stored offset value from each of the n measured values and compare each of the duly calculated values with the stored running threshold, and to command the transmission of information representative of a stopped state of the vehicle if, and only if, the n calculated values are all less than the stored running threshold and roughly equal to each other with a tolerance margin corresponding to the stored noise value.

Other characteristics, objects and advantages of the invention will become apparent from the detailed description that follows, with reference to the appended drawings which represent, by way of non-limiting example, a preferred embodiment. In these drawings:

FIG. 1 is a functional block diagram representing a movement sensor associated with a device according to the invention for processing signals from this sensor, FIG. 2 is a graph representing a succession of measured accelerations corrected by applying the processing method according to the invention, and FIG. 3 is an algorithm representing the steps of the processing method according to the invention.

The device according to the invention shown by way of example in FIG. 1 is for processing acceleration values output by a movement sensor 2 on board a vehicle, in order to determine a running threshold forming a "boundary" between the stopped and running states of this vehicle.

This processing device finds particular application in monitoring systems including sensors mounted on each wheel 1 of the vehicles, dedicated to measuring parameters, such as the pressure and/or temperature of the tires fitted on these wheels, and intended to inform the driver of any abnormal variation in the measured parameter.

In the context of this application, the processing device is intended to be associated with a movement sensor 2 consisting of an accelerometer made up of a deformable beam-type strain gage, designed to be on board with a measurement sensor, and the function of this processing device is to determine a running threshold forming a "boundary" between the stopped and running states of the vehicle.

According to the example shown in FIG. 1, this processing device includes, firstly, means 3 of measuring the values of the signals output by the movement sensor 2, conventionally including an analog/digital conversion unit.

This processing device also includes a storage unit 4 for storing specific values intended for processing the measured acceleration values, and mainly consisting of:

a reference value, called offset value, representative of the value of the signal output by the movement sensor 2, with the vehicle stopped, a so-called noise value, characteristic of the operation of the movement sensor 2, and representative of the white noise of the latter, and an acceleration value determining a running threshold of the motor vehicle.

The processing device according to the invention finally includes a computation unit 5 connected to the measurement means 3 and to the storage unit 4, and mainly programmed for:

in a preliminary phase, measuring the value of the signal output by the movement sensor 2, with the vehicle stopped, and storing said measured value as a reference value AcOFF, called offset value (during this preliminary phase, in addition and as mentioned above, a so-called noise value Bb, characteristic of the operation of the movement sensor 2, and representative of the white noise of the latter, and an acceleration value Sa determining the running threshold of the motor vehicle are also stored), then throughout the life of the vehicle, for:

commanding sequences of n=5 successive measurements of the value of the signal output by the movement sensor 2, and, for each of these sequences, subtracting the stored offset value AcOFF from each of the n measured values AcB and comparing each of the duly calculated values with the stored running threshold Sa, and commanding the transmission of information representative of a stopped state of the vehicle if, and only if, the n calculated values are all less than the stored running threshold and roughly equal to each other with a tolerance margin corresponding to the stored noise value Bb, changing the stored offset value AcOFF and thus continually correcting any drifts resulting from the aging of the movement sensor 2 and temperature variations.

The procedure applied throughout the life of the vehicle to determine the state of said vehicle and continually correct the stored offset value is explained below with reference to FIGS. 2 and 3.

Firstly, and at each instant t of acquisition of a measured acceleration value AcB(t) (FIG. 3), the computation unit 5 calculates a corresponding corrected value Ac(t) such that Ac(t)=AcB(t)−AcOFF, in which AcOFF is the offset value stored at this instant t.

When the calculated value Ac(t) is less than the stored running threshold Sa, and, also, when the absolute value of the difference between this value Ac(t) and the equivalent value Ac(t−1) calculated at the preceding acquisition instant t−1 is less than the stored noise value Bb, the computation unit 5 then commands incrementation of a counter by one unit n.

Based on this comparative data, the decision principle then consists, according to the invention, in considering the vehicle, as being in the stopped state when, on successive acquisitions of measured values, the counter is incremented n=5 times successively.

At the same time, when the counter is incremented for the first time, that is, when n takes the value n=1, the acceleration value AcB(t) measured at the corresponding instant t is stored as value AcS representative of the current incrementation sequence.

On subsequent validation of this sequence, that is, when this first increment (n=1) is followed by four successive increments (n=5), the computation unit 5 compares this value AcS with the stored offset value AcOFF, then fixes:

AcOFF+0.5 if AcS>AcOFF,
AcOFF−0.5 if AcS<AcOFF, as the new offset value AcOFF to be stored.

To sum up, the processing according to the invention therefore means that a vehicle is considered as being in a stopped state only if the values of n=5 successive measurements are stable (difference between these values less than the noise Bb) and less than the running threshold Sa.

FIG. 2 shows, as an example, a graph comprising:

a first sequence of five measurements satisfying both decision criteria (Ac(t)<Sa and Ac(t)−Ac(t−1)<Bb) and therefore resulting in the transmission of vehicle stopped information, and a second sequence of five measurements not satisfying the second decision criterion and causing the incrementation of the counter n to be reset.

It will be noted that the stored offset value is continually corrected in order to take account of any drifts, while, however, safeguarding against potential risks of unjustified drifts in this stored value, which can, for example, result from defects in the storage unit 4.

As an example, with digital data, a movement sensor 2 conventionally used on implementing the method according to the invention, can have an offset of +/−9 g and a numerical correction of 12 g is usually applied to this value so that the offset value output from said sensor extends between 3 g and 21 g corresponding to a vehicle speed roughly between 10 km/h and 40 km/h.

These output values are, furthermore, then evaluated with a tolerance margin equal to the white noise Bb of the movement sensor 2, a value initially stored conventionally of the order of +/−2 g.

Based on these values, the running threshold can be fixed at a value of 3 g corresponding to a speed of 10 km/h.

Finally, the values of the measurements from the movement sensor 2 are advantageously acquired with an interval of between 10 s and 60 s.

The invention claimed is:

1. A method of processing measurement signals from a movement sensor (2) on board a motor vehicle, the method comprising the steps of:

in a preliminary phase:

measuring, with the vehicle stopped, a reference value (AcOFF) of a signal output by the movement sensor (2), and storing said measured reference value as an offset value;

by an acceleration value (Sa) determining a running threshold of the motor vehicle and fixing and storing the running threshold; and storing a noise value (Bb), the noise value being characteristic of operation of the movement sensor (2) and representative of white noise of the movement sensor (2); and then, throughout the life of the vehicle:

measuring the movement sensor signal output by executing sequences of a quantity n of successive measurements of the signal output, to produce a corresponding n successive measured values for each sequence, wherein, for each sequence, i) the stored offset value is subtracted from each of the n successive measured values of each sequence to produce n calculated values, ii) each of the n calculated values is compared with the stored running threshold, and iii) information representative of a stopped state of the vehicle is transmitted if, and only if, the n calculated values are all less than the stored running threshold, and the n calculated values are each equal to each other within a tolerance margin corresponding to the stored noise value.

2. The processing method as claimed in claim 1, characterized in that, following a sequence of n measurements giving rise to vehicle stopped information, a new offset value according to the n measured values of said sequence of n measurements is substituted for the stored offset value.

3. The processing method as claimed in claim 2, further comprising the steps of:

after said sequence of n measurements giving rise to vehicle stopped information, determining a sequence value representative of the n measured values of said sequence of n measurements giving rise to vehicle stopped information;

comparing the sequence value with the stored offset value; and storing a new offset value, wherein, if the sequence value is greater than the stored offset value, the new offset value is the stored offset value added to a predetermined correction coefficient, and if the sequence value is less than the stored offset value, the new offset value is the stored offset value subtracted from a predetermined correction coefficient.

4. The processing method as claimed in claim 3, characterized in that the value of the correction coefficient is fixed at 0.5.

5. The processing method as claimed in claim 4, characterized in that the first measured value of the corresponding sequence of n measurements is fixed as the value of a sequence.

6. The processing method as claimed in claim 4, characterized in that each sequence of measurements consists in measuring successively, with an interval roughly between 10 seconds and 60 seconds, n values of the signal output by the movement sensor (2).

7. The processing method as claimed in claim 4, characterized in that each sequence of measurements consists in performing n=5 successive measurements of the value of the signal output by the movement sensor (2).

8. The processing method as claimed in claim 3, characterized in that a first measured value of the sequence of n measurements is fixed as the value of a sequence.

9. The processing method as claimed in claim 8, characterized in that each sequence of measurements consists in measuring successively, with an interval roughly between 10 seconds and 60 seconds, n values of the signal output by the movement sensor (2).

10. The processing method as claimed in claim 8, characterized in that each sequence of measurements consists in performing n=5 successive measurements of the value of the signal output by the movement sensor (2).

11. The processing method as claimed in claim 3, characterized in that each sequence of measurements consists in measuring successively, with an interval roughly between 10 seconds and 60 seconds, n values of the signal output by the movement sensor (2).

12. The processing method as claimed in claim 3, characterized in that each sequence of measurements consists in performing n=5 successive measurements of the value of the signal output by the movement sensor (2).

13. The processing method as claimed in claim 2, characterized in that each sequence of measurements consists in measuring successively, with an interval roughly between 10 seconds and 60 seconds, n values of the signal output by the movement sensor (2).

14. The processing method as claimed in claim 2, characterized in that each sequence of measurements consists in performing n=5 successive measurements of the value of the signal output by the movement sensor (2).

15. The processing method as claimed in claim 1, characterized in that each sequence of measurements consists in measuring successively, with an interval roughly between 10 seconds and 60 seconds, n values of the signal output by the movement sensor (2).

16. The processing method as claimed in claim 15, characterized in that each sequence of measurements consists in performing n=5 successive measurements of the value of the signal output by the movement sensor (2).

17. The processing method as claimed in claim 1, characterized in that each sequence of measurements consists in performing n=5 successive measurements of the value of the signal output by the movement sensor (2).

18. A device for processing measurement signals from a movement sensor (2) on board a motor vehicle, comprising:

measurement means (3) of measuring values of the signals (AcB) output by the movement sensor (2);

storage means (4) of storing i) a reference value (AcOFF), called an offset value, representative of the value of a reference signal output by the movement sensor (2) when the vehicle is stopped, ii) a noise value (Bb) characteristic of operation of the movement sensor and representative of white noise of the movement sensor, and iii) an acceleration value (Sa) determining a running threshold of the vehicle; and a computation unit (5), connected to the measurement means (3) and to the storage means (4), and programmed to, throughout the life of the vehicle, command sequences of n successive measurements of the value of the signal output by the movement sensor (2), and for each of these sequences, i) to subtract the stored offset value from each of the n measured values as calculated values and compare each of the calculated values with the stored running threshold, and ii) to command the transmission of information representative of a stopped state of the vehicle if, and only if, a) the n calculated values are all less than the stored running threshold, and b) the n calculated values are all equal to each other within a tolerance margin corresponding to the stored noise value.

* * * * *